United States Patent
Sommers

(10) Patent No.: US 9,415,789 B2
(45) Date of Patent: Aug. 16, 2016

(54) MOTORIZED CART

(71) Applicant: Paul E. Sommers, Orrville, OH (US)

(72) Inventor: Paul E. Sommers, Orrville, OH (US)

( * ) Notice: Subject to any disclaimer, the term of this patent is extended or adjusted under 35 U.S.C. 154(b) by 0 days.

(21) Appl. No.: 14/756,126

(22) Filed: Aug. 4, 2015

(65) Prior Publication Data

US 2016/0039445 A1    Feb. 11, 2016

Related U.S. Application Data

(60) Provisional application No. 61/999,967, filed on Aug. 11, 2014.

(51) Int. Cl.
*B62B 5/00* (2006.01)
*B62B 1/10* (2006.01)

(52) U.S. Cl.
CPC ............ *B62B 5/0046* (2013.01); *B62B 1/10* (2013.01); *B62B 5/0036* (2013.01); *B62B 5/0053* (2013.01); *B62B 5/0066* (2013.01)

(58) Field of Classification Search
CPC .......................... B62B 5/0046; B62B 5/0036
See application file for complete search history.

(56) References Cited

U.S. PATENT DOCUMENTS

| | | | | |
|---|---|---|---|---|
| 4,289,212 A | * | 9/1981 | Immel .................. | B60K 1/00 180/19.1 |
| 6,129,166 A | * | 10/2000 | Sueshige .............. | B62B 5/0026 180/65.6 |
| 6,474,007 B1 | * | 11/2002 | Sueshige .............. | B62B 1/20 180/19.3 |
| 6,793,236 B1 | | 9/2004 | Mitchell | |
| 7,775,306 B1 | * | 8/2010 | Adkins .................. | B62B 1/18 180/19.3 |
| 7,793,744 B1 | * | 9/2010 | Hardie .................. | B62B 1/12 180/19.1 |
| 8,235,153 B2 | * | 8/2012 | Robinson ............. | B60L 11/18 180/19.3 |
| 9,120,499 B2 | * | 9/2015 | Michel, Jr. ........... | B62B 1/18 |
| 2007/0194542 A1 | * | 8/2007 | Dixon ................... | A01M 31/006 280/47.24 |
| 2008/0197608 A1 | * | 8/2008 | Dixon ................... | A01M 31/006 280/654 |
| 2012/0146386 A1 | * | 6/2012 | Rowlands ............ | B60L 7/003 298/2 |

\* cited by examiner

*Primary Examiner* — Kevin Hurley
(74) *Attorney, Agent, or Firm* — Timothy S. Stevens; Karen L. Kimble

(57) ABSTRACT

A cart suitable for transporting game that includes a shield, an axle, an electric motor, a battery, a first wheel, a second wheel, and a frame. The axle is attached to the frame so that the axle can rotate around the longitudinal axis of the axle, the first wheel is spaced apart from the second wheel. The first and second wheels are attached to the axle. The electric motor is in mechanical communication with the axle. The electric motor is in electrical communication with the battery so that the electric motor causes the axle and wheels to rotate. The shield is attached to the frame at a position below the axle so that the cart is protected when traversing undeveloped and rough terrain where, for example, rocks, stumps or other such conditions may be encountered which could damage components of the cart such as the motor or axle.

3 Claims, 3 Drawing Sheets

MOTORIZED CART

BACKGROUND OF THE INVENTION

The instant invention relates to cart devices and more particularly to a battery powered cart suitable, for example, for assisting a hunter in transporting game. The prior art of battery powered carts suitable for assisting a hunter in transporting game is well developed. For example, U.S. Pat. No. 6,793,236 disclosed a cart powered by a portable battery powered electric drill. U.S. Pat. No. 7,793,744 disclosed a battery powered cart that folded for convenient storage. A remaining problem in the art of battery powered carts suitable for transporting game occurs when traversing undeveloped and rough terrain where, for example, rocks, stumps and other such conditions may be encountered which can damage components of the cart such as the motor or axle.

SUMMARY OF THE INVENTION

The instant invention is an advance in the art of battery powered carts suitable for assisting a hunter in transporting game. One important benefit of the instant invention is the incorporation of a shield positioned below the axle of the cart to protect the axle and other components of the cart when the cart is traversing undeveloped and rough terrain where, for example, rocks, stumps and other such conditions may be encountered.

DETAILED DESCRIPTION

Figure 1:
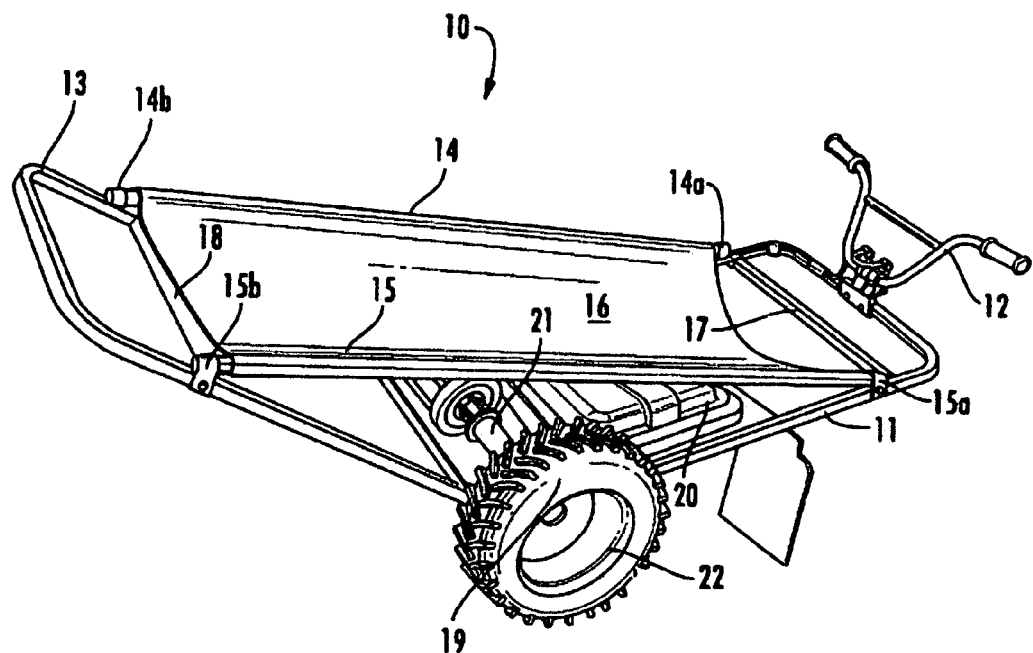
FIG. 1 is a perspective view in full of a cart of the instant invention, which cart includes a hammock upon which game, such as a deer, can be placed.

Referring now to FIG. 1, therein is shown a perspective view in full of a cart 10 of the instant invention, which cart includes a hammock 16 upon which game, such as a deer, can be placed. The basic structure of the cart 10 comprises arm 11 pivotally attached to frame 13. Hammock 16 is supported on one side by right hammock support tubing 14 and on the other side by left hammock support tubing 15. Right hammock support tubing 14 is attached to frame 13 by right hammock support tubing connector 14b. Right hammock support tubing 14 is attached to arm 11 by right hammock support tubing connector 14a. Left hammock support tubing 15 is attached to frame 13 by left hammock support tubing connector 15b. Left hammock support tubing 15 is attached to arm 11 by left hammock support tubing connector 15a. Handlebar 12 is attached to arm 11. Arm brace 17 and frame brace 18 are provided to strengthen the arm 11 and the frame 13 respectively. Tire 19 is mounted on wheel 22. Wheel 22 is bolted to a wheel hub described below which wheel hub is connected to the axle of transaxle 21. A battery, battery charger and motor controller are positioned in battery box 20. The basic structure of the cart 10 is preferably made of extruded aluminum tubing.

Figure 2:
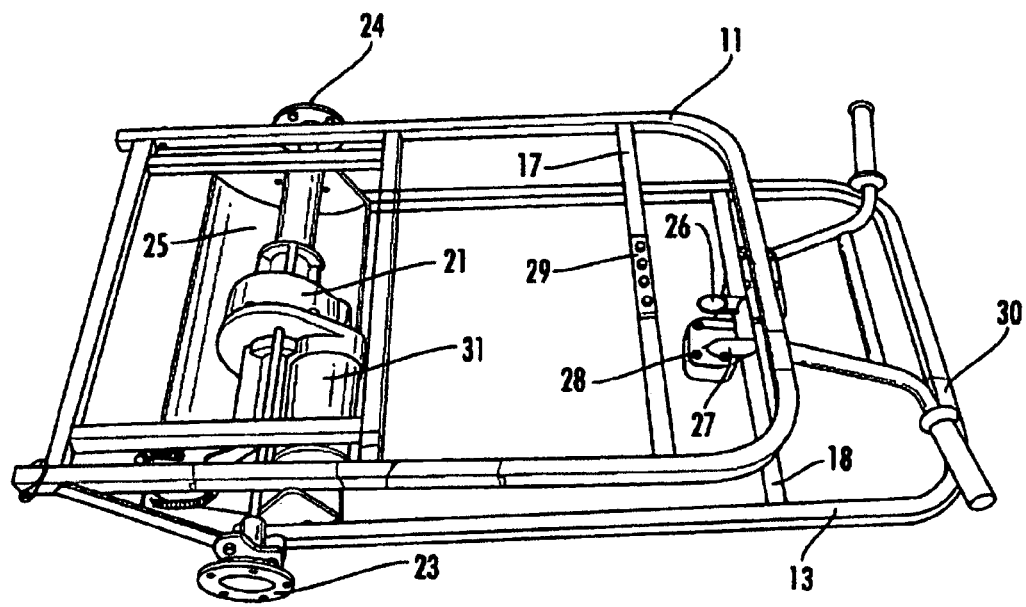
FIG. 2 is a perspective view in full of the basic structure of the cart shown in FIG. 1 folded for storage.
Figure 3:
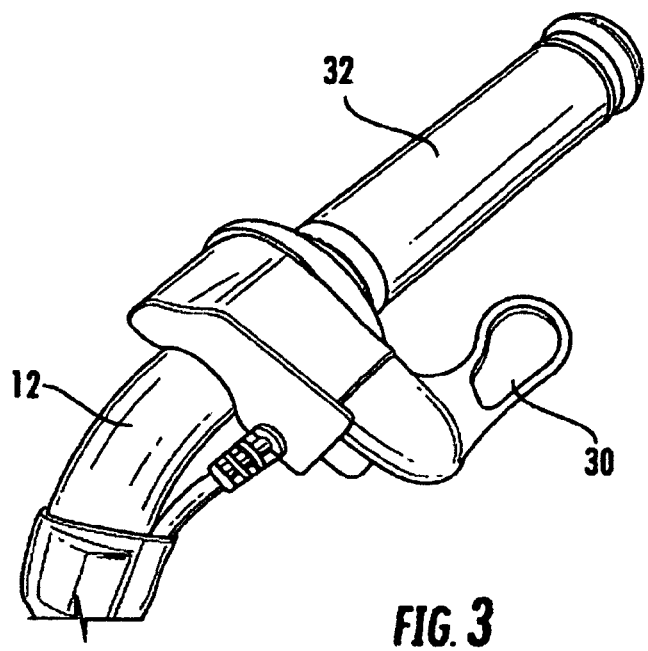
FIG. 3 is a detailed perspective view in full showing the thumb throttle motor control of the cart shown in FIG. 1.

Referring now to FIG. 2, therein is shown a perspective view in full of the basic structure of the cart shown in FIG. 1 folded for storage. LED light bar 29 is attached to the underside of arm brace 17. Headlight 28 is attached to the front of frame brace 18. Handlebar folds by left handlebar tensioner 26 and right handlebar tensioner 27. Transaxle 21 incorporates an electric motor 31, a transmission, a differential and an axle terminating at one end by right wheel hub 23 and at the other end by left wheel hub 24. Referring now to both FIG. 2 and FIG. 3, thumb throttle 30 is mounded on handlebar 12 adjacent right handlebar grip 32. Referring again to FIG. 2, skid plate 25 (preferably made of aluminum) is positioned below transaxle 21. In use, the skid plate 25 protects the transaxle 21 from damage when the cart is used to transport game over undeveloped and rough terrain where, for example, rocks, stumps and other such conditions may be encountered. A cover, not shown in FIG. 2, is preferably positioned over the transaxle 21 so that the transaxle 21 is enclosed by such cover and the skid plate 25.

Figure 4:
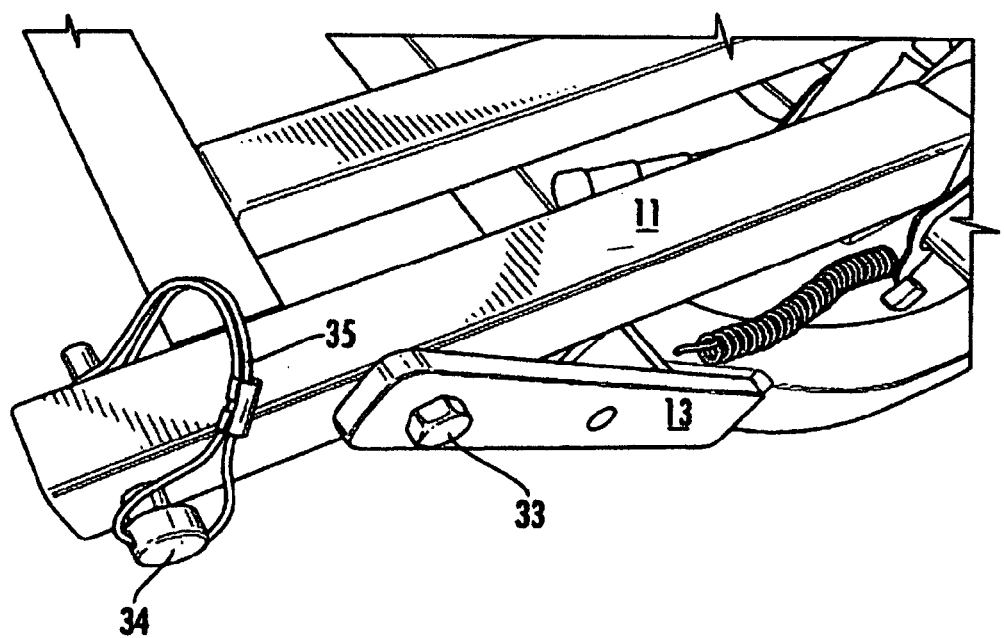
FIG. 4 is a perspective view in full showing the details of the frame and arm of the cart of FIG. 1 in a folded position.

Referring now to FIG. 4, therein is shown a perspective view in full showing the details of the frame 13 and arm 11 of the cart of FIG. 1 in a folded position. It will be noted that arm 11 pivots on frame 13 by right pivot bolt 33. Right assembly pin 34 and right assembly pin keeper 35 are shown in their stored position.

Figure 5:
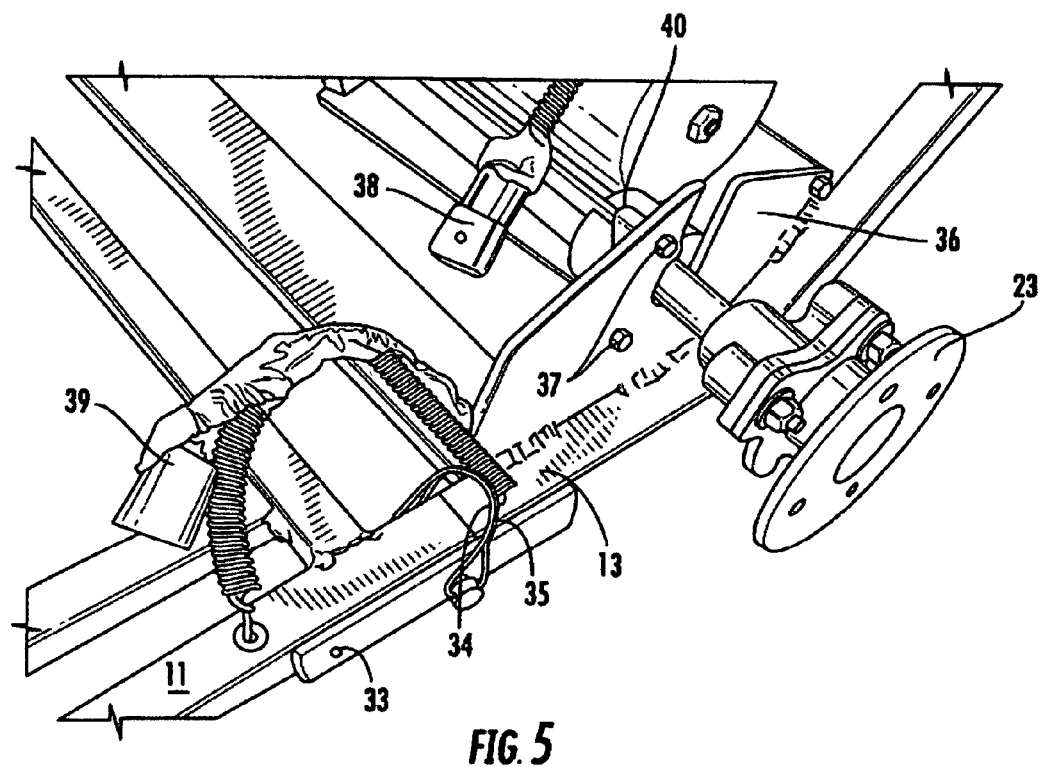
FIG. 5 is a perspective view in full showing details of the transaxle mounting of the cart of FIG. 1.

Referring now to FIG. 5, therein is shown a perspective view in full showing details of the transaxle mounting of the cart of FIG. 1. Right transaxle mounting plate 36 is attached to frame 13. Right transaxle axle bearing mount 40 is bolted to right transaxle mounting plate 36 by bolts 37. Arm 11 is shown pivoted on right pivot bolt 33 so that right assembly pin 34 secures arm 11 to frame 13. Right assembly pin keeper 35 is provided to secure right assembly pin 34 in place. Electrical connector 38 provides electrical communication with motor 31 from the battery and motor controller. Electrical connector 39 provides electrical communication with thumb throttle 30, light bar 29 and headlight 28 from the battery and motor controller.

The specific electric motor and battery used are not critical in the instant invention. For example, the electric motor can be a brush or a brushless motor. The battery can be of any type of battery but a lithium ion battery is preferred. Preferably, the motor and axle are combined with a transmission in the form of a transaxle and preferably the transaxle incorporates a differential. The specific control system used to control the electric motor is not critical in the instant invention but the thumb throttle 30 shown in FIG. 3 connected to a motor controller located in the battery box 20 shown in FIG. 1 is preferred.

The battery powered cart of the instant invention can be used by hunters to transport harvested game animals such as deer and elk. However, it should be understood that the battery powered cart of the instant invention can also be used by first responders to transport patients as well as by workers (such as stone masons) to transport objects (such as sacks of Portland cement at a construction site).

CONCLUSION

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains.

What is claimed is:

1. A cart suitable for transporting game, comprising: a skid plate, an axle, an electric motor, a battery, a first wheel, a second wheel, and a frame, the axle attached to the frame so that the axle can rotate around the longitudinal axis of the axle, the first wheel spaced apart from the second wheel, the first and second wheels being attached to the axle, the electric motor being in mechanical communication with the axle, the electric motor being in electrical communication with the battery so that the electric motor causes the axle and wheels to rotate, the skid plate being attached to the frame at a position below the axle when the cart is in use, the cart being a two-wheeled cart.

2. The cart of claim 1, where in the mechanical communication of the electric motor with the axle comprises a transmission between the electric motor and the axle.

3. The cart of claim 2, wherein the electric motor, the transmission and the axle are combined to form a transaxle.

* * * * *